United States Patent [19]

Abernathy

[11] 4,354,117
[45] Oct. 12, 1982

[54] SOLAR ENERGY CONVERSION PLANT

[76] Inventor: Frank W. Abernathy, 1518 Riverbend Rd., Columbus, Ohio 43223

[21] Appl. No.: 204,071

[22] Filed: Nov. 4, 1980

[51] Int. Cl.$^3$ .............................................. F03G 7/02
[52] U.S. Cl. .................................. 290/1 R; 60/641.15
[58] Field of Search .......................... 60/641.8, 641.15; 290/1 R

[56] References Cited

U.S. PATENT DOCUMENTS

| | | | |
|---|---|---|---|
| 3,070,703 | 12/1962 | Podolny | 60/641.8 |
| 3,868,823 | 3/1975 | Russell, Jr. et al. | 60/641.15 |
| 3,999,389 | 12/1976 | Bryce | 60/641.15 |
| 4,010,732 | 3/1977 | Sawata et al. | 60/641.15 |
| 4,047,385 | 9/1977 | Brinsevec | 60/641.15 |
| 4,079,591 | 3/1978 | Derby et al. | 60/641.8 |
| 4,198,826 | 4/1980 | Chromie | 60/641.15 |

Primary Examiner—B. Dobeck
Assistant Examiner—Shelley Wade
Attorney, Agent, or Firm—Harvey B. Jacobson

[57] ABSTRACT

Solar radiation is concentrated by a parabolic reflector having a solar tracking system associated therewith, onto a heat absorbing conduit circulating a heat exchange medium through a steam generator having a burner as an auxiliary source of heat. The steam generator operates a turbine driven electrical generator. The electrical energy output of the generator in excess of load demand, is converted into and stored as chemical energy from which fuel for the burner is derived. The solar tracking system has two moveable signal generating cell means: the first generates a signal in response to solar energy in any position, the second generates a signal controlling a servomotor for tracking.

5 Claims, 14 Drawing Figures

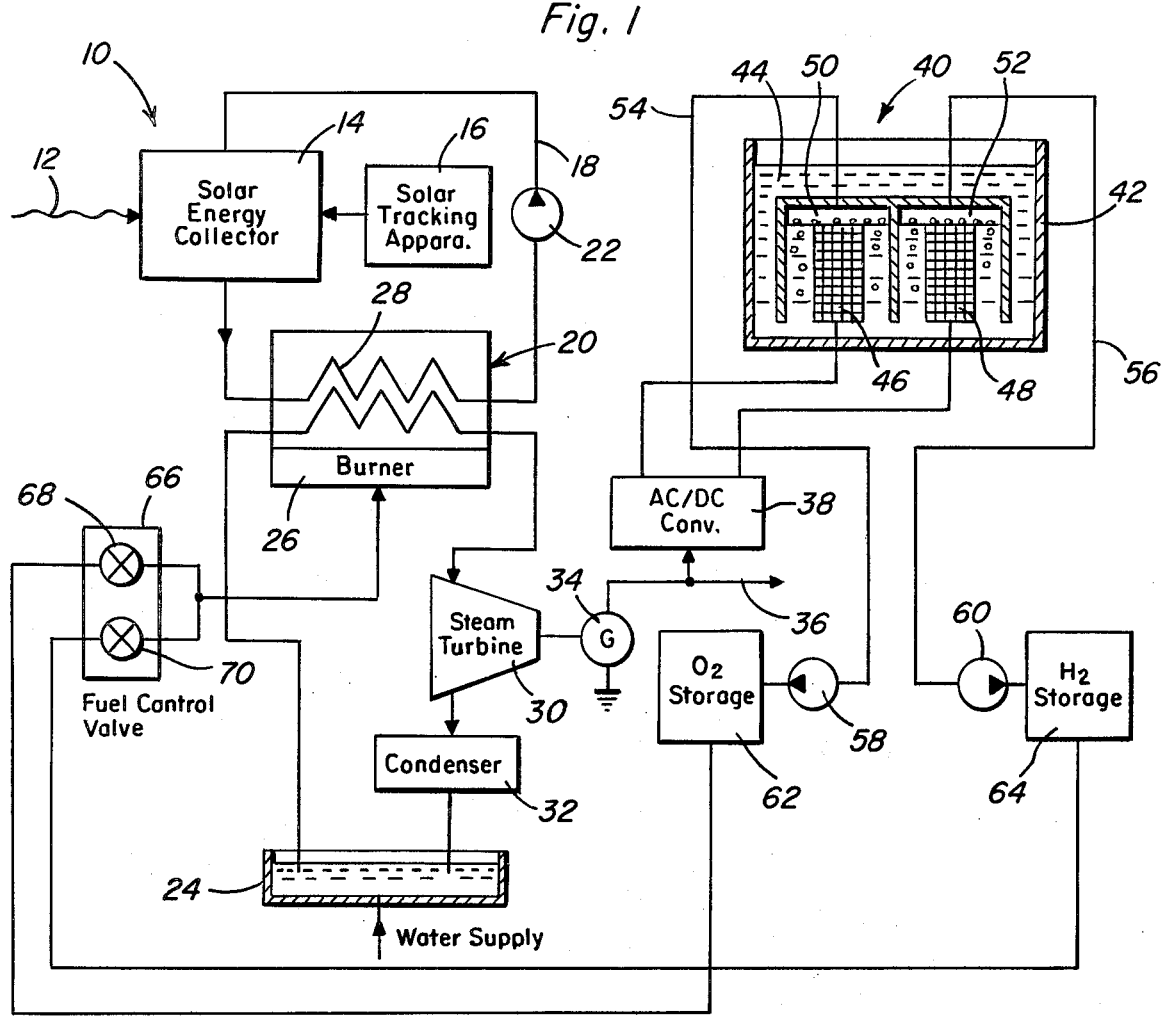
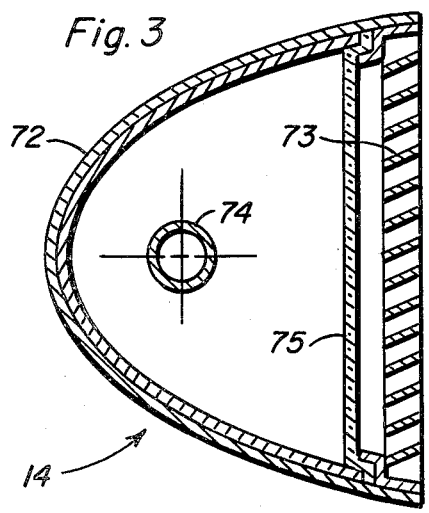
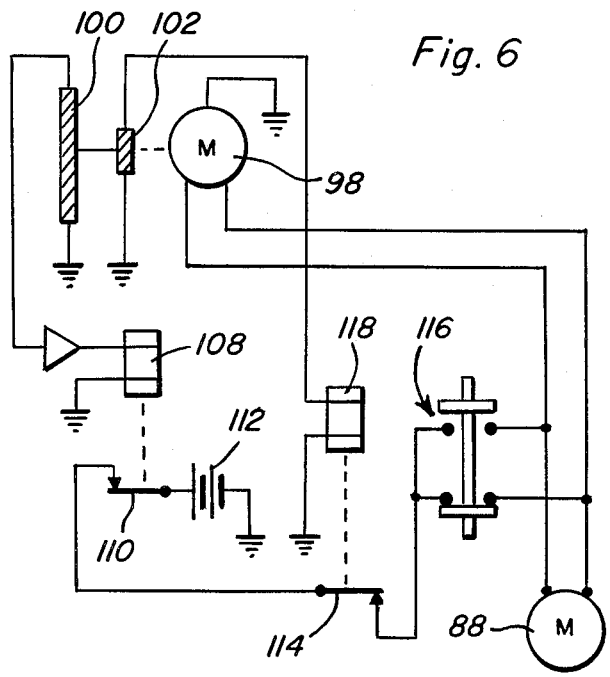

4,354,117

SOLAR ENERGY CONVERSION PLANT

BACKGROUND OF THE INVENTION

This invention relates to the harnessing of solar radiation as a source of energy as an alternative power source preferable to present nuclear and fossil fuel sources.

The use of reflectors for concentrating solar radiation in a solar energy collector, having a solar tracking system associated therewith, is generally well-known. In connection with such solar energy collectors, there is a considerable problem in storing the energy collected as well as transmission of the energy with minimum loss to remote locations of need.

It is therefore an important object of the present invention to provide a solar energy conversion system through which solar radiation collected, stored and converted into useful form on demand, in an efficient and less costly manner as compared to prior art arrangements.

SUMMARY OF THE INVENTION

In accordance with the present invention, solar radiation is concentrated by a parabolic reflector along the axis of a heat absorbing conduit section circulating a heat exchange medium through a steam generator from which motivating steam is supplied to a turbine driving an electrical generator. The parabolic reflector is intermittantly rotated by servomotors about perpendicular axes intersecting at the focal point of the reflector at which the heat absorbing conduit section lies, under control of a solar tracking system including photocells and photocell tracking motors imparting movement to the photocells in synchronism with the servomotors for the reflector under control of the photocells.

The electrical energy produced while solar energy is being absorbed, meets the demand of a load and any excess energy is converted into a DC voltage applied to electrode grids of a chemical energy convertor from which fuel products such as oxygen and hydrogen gases are produced by electrolysis and stored under pressure. The oxygen and hydrogen are transported by conduits to a location at which they are selectively withdrawn through fuel control valving to form a gaseous fuel mixture fed to a burner associated with the steam generator as a secondary or auxiliary source of heat enabling the generation of electrical energy during periods when solar energy is not available. The fuel products could also be transported by conduits to other power plant or consumer locations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 1 is a schematic illustration of a solar energy conversion system in accordance with the present invention.

FIG. 3 is a transverse section view taken substantially through a plane indicated by section line 3—3 in FIG. 2.

FIG. 5 is a section view taken substantially through a plane indicated by section line 5—5 in FIG. 4a.

FIGS. 6 and 7 are circuit diagrams of relay controls associated with the solar tracking apparatus shown in FIGS. 4 and 5.

DETAILED DESCRIPTION OF PREFERRED EMBODIMENT

Figure 2:
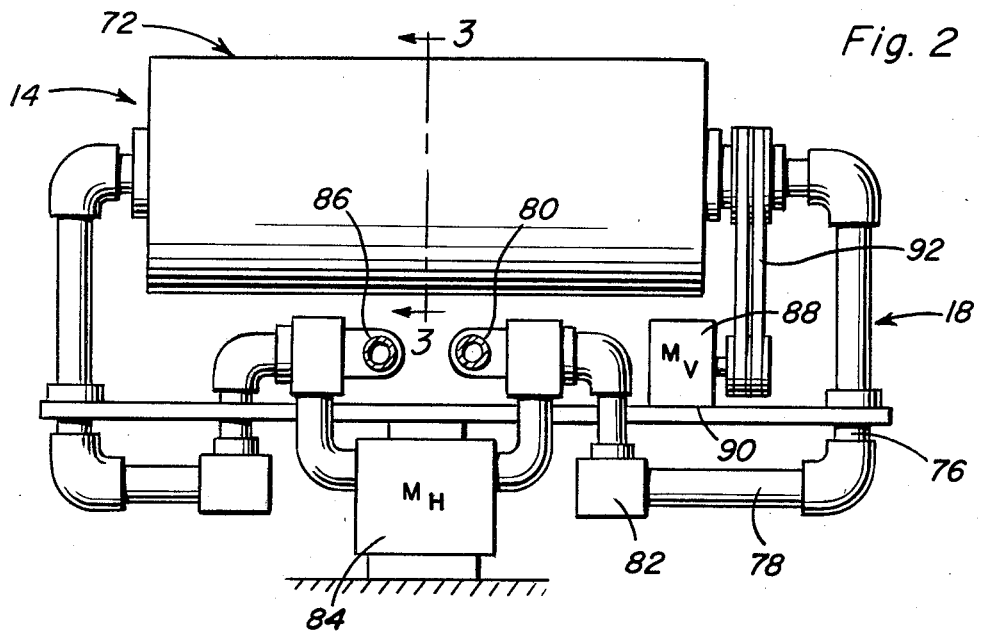
FIG. 2 is a rear side elevation view of one form of solar energy collector associated with the system depicted in FIG. 1.

Referring now to the drawings in detail, FIG. 1 schematically illustrates a power generating system in accordance with the present invention, generally referred to by reference numeral 10. Energy is derived from the sun as solar radiation, indicated by reference numeral 12, received in a solar energy collector 14. A solar tracking system 16 is associated with collector 14 to render it operative to collect the maximum available solar energy. The solar energy is absorbed in the collector by a heat exchange medium such as a fluent mixture of potassium and sodium metals conducted by a suitably insulated conduit 18. Circulating flow of the heat exchange medium between the collector 14 and a heat exchanger 20 is induced by a pump 22. The heat exchanger 20 may be in the form of a steam generating boiler to which water is conducted from a storage tank to which make up water is supplied. A gaseous fuel burner 26 is associated with the heat exchanger or boiler 20 as an auxiliary source of heat, the primary source being the heat exchange coil 28 through which the heat exchange medium is circulated from the collector 14.

High pressure steam in the boiler 20 is fed to a steam turbine 30 from which the spent steam is discharged and returned by condenser 32 as liquid water to the storge tank 24. The turbine thus converts the energy in the motivating steam into kinetic energy for driving an electrical generator 34 from which AC electrical power may be fed by a power cable 36 to some remotely located electrical load. Electrical energy in excess of the load demand is fed to a converter 38 from which the excess electrical energy in DC voltage form is fed to a chemical energy converter, generally referred to by reference numeral 40.

The chemical energy converter 40 includes a container or tank 42 holding a body of acidified water 44 within which a pair of electrode grids 46 and 48 are immersed. These grids are connected to the positive and negative output terminals of the AC/DC electrical converter 38 so that an electrolysis action occurs within the tank 42 causing the generation of gaseous oxygen and hydrogen as gas bubbles on the grids. The oxygen and hydrogen gases are separately collected in enclosures 50 and 52 from which the gases are conducted by conduits 54 and 56 under the suction pressure of pumps 58 and 60 to storage tanks 62 and 64. It will therefore be apparent that the excess energy derived from the primary heat source in coil 28 of the boiler 20 will be used to store oxygen and hydrogen gases under pressure at a suitable location possibly remote from the solar collector 14.

The oxygen and hydrogen may be selectively withdrawn from the tanks 62 and 64 to form a fuel mixture for burner 26 under control of a fuel control valve 66. The fuel control valve includes valve sections 68 and 70 through which metered proportions of oxygen and hydrogen are fed as a fuel mixture to the burner 26 when in use as a secondary source of heat, generating steam in the boiler 20. Thus, the power generating system 10 may remain operative even during night time when no solar energy is available.

Referring now to FIGS. 2 and 3, the solar collector 14 includes a parabolic reflector 72 having an insulated external backing surface and a reflective internal surface, such as polished aluminum foil, through which solar radiation is concentrated at focal points lying on a horizontal focal axis about which the reflector is angularly moved by the solar tracking system 16. An externally blackened, heat absorbing section 74 of conduit 18 extends through the reflector 72, coaxial with the horizontal axis so as to receive the concentrated, reflected solar radiation thereon. Solar radiation enters the reflector through an adjustable, louvered panel 73 and a transparent heat insulating sheet 75 as shown in FIG. 3. The conduit section 74 is connected to conduit sections 76 and 78 externally of the reflector 72 as shown in FIG. 2 for angular displacement with the reflector about a vertical axis substantially intersecting the horizontal axis at the focal point. These conduit sections movable with the reflector about the vertical axis, are coupled to stationary sections 80 of the conduit system 18 through swivel connectors 82 in a manner well-known in the art. The stationary circuit sections 80 are connected to the pump 22 and to a conventional type of steam generator such as the boiler 20 to complete the heat exchange circulating loop hereinbefore described with respect to FIG. 1.

The reflector 72 is supported through conduit section 76 and a platform 90 rotatable about the vertical axis for horizontal solar tracking purposes by a stationary servomotor 84, as shown in FIG. 2. A servomotor 88 mounted on the platform 90 and rotatable with the reflector 72 is drivingly connected by belt gearing 92 to the reflector for rotation thereof about the horizontal axis for vertical solar tracking purposes as shown in FIG. 2. Vertical and horizontal tracking movements of the reflector is accordingly effected by energization of the servomotors 88 and 84 under control of the solar tracking system 16 illustrated in detail in FIGS. 4, 5, 6 and 7.

Figure 4A:
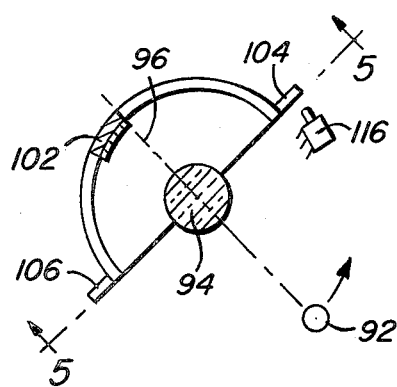
FIGS. 4a through 4h are simplified section views through a solar tracking photocell apparatus associated with the solar energy collector in different operational positions with parts shown somewhat symbolically.
Figure 4B:
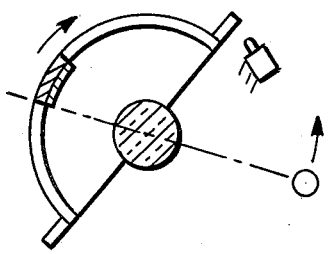
Figure 4C:
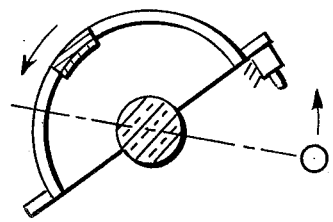
Figure 4D:
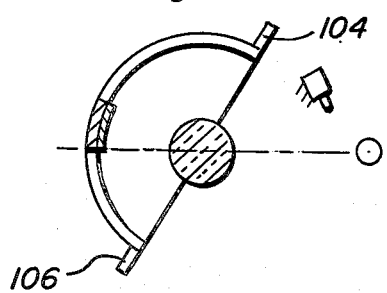
Figure 4E:
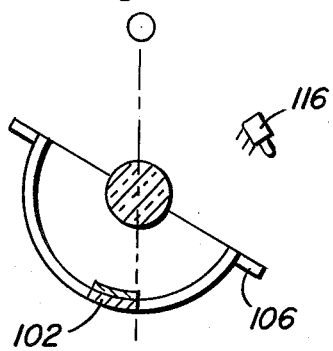
Figure 4F:
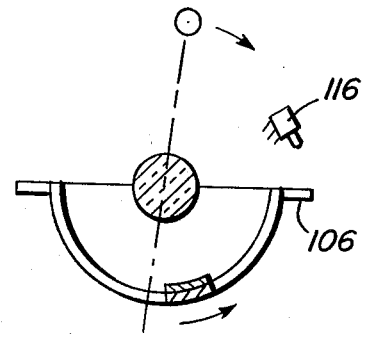
Figure 4G:
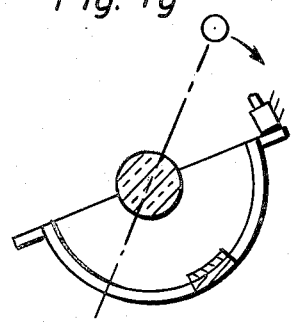
Figure 4H:
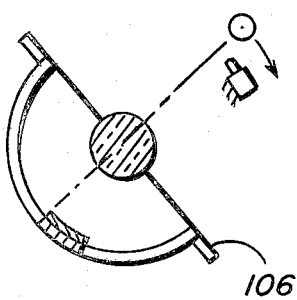
Figure 5:
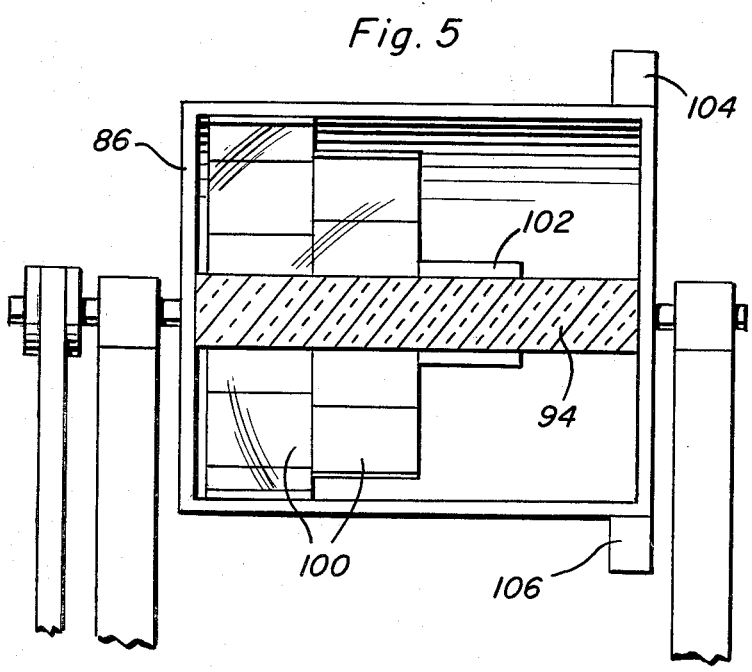

As shown in FIGS. 4 and 5, a semi-cylindrical, opaque housing 86 and a cylindrical lens 94 concentric thereto are mounted for movement about a horizontal tracking axis during exposure to solar radiation adjacent to the reflector 72. Vertical movement of the sun 92 as diagrammatically shown in FIGS. 4a through 4h between low positions at sunrise and sunset, to a high position at noon will produce angular movement of a collimated beam 96 of solar radiation emerging from the lens 94 that moves in the opposite directions by an equal angle about the tracking axis extending through the lens 94. The collimated beam is a relatively narrow slit of light that impinges on a plurality of arcuate, solar energy cells 100 mounted in angularly overlapping relation to each other on housing 86 which also mounts a centrally located control cell 102. Only during daylight hours will the collimated beam of light 96 impinge continuously on the cells 100 as the sun moves in a vertical direction between sunrise and sunset positions.

As shown in the relay tracking circuit of FIG. 6, the solar cells 100 when exposed to solar radiation effect energization of the tracking motor 98 while the cell 102 controls energization of the vertical servomotor 88 to effect vertical tracking movement of the reflector 72. At sunrise, the reflector 72 and housing 86 are in a starting position as shown in FIG. 4a with the cells 100 and 102 exposed to radiation in beam 96 so as to generate signal energy sufficient to energize relays 108 and 118 closing normally open relay switch 110 and opening relay switch 114. When the sun has risen somewhat to the position depicted in FIG. 4b, cell 102 is no longer active and relay 118 is deenergized to close its relay switch 114. Power from source 112 is thereby transmitted through normally closed relay switch 114 and a reversing switch 116 to one power terminal of tracking motor 98 causing it to begin a reverse tracking movement in one direction from its starting position. Such reverse tracking operation continues until actuator 104 on the housing 86 engages reversing switch 116 as shown in FIG. 4c displacing switch 116 to its other operative position from that shown in FIG. 6 to begin a forward tracking movement until cell 102 is brought into focus with beam 96. Such tracking operation of tracking by motor 98 is therefore intermittant and appropriately synchronized with vertical tracking movement of the reflector by motor 88.

After initial forward tracking movement, solar radiation is focused on cell 102 to generate signal energy sufficient to energize relay 118 and open relay switch 114 to interrupt energization of servomotor 88 and tracking motor 98. Thus, such forward vertical tracking movement stops until movement of the sun beam 96 comes out of focus with cell 102 to resume tracking movement. Intermittant forward tracking movement of the reflector thus causes it to follow the sun.

After the sun reaches the highest position at noon time as shown in FIG. 4e and begins its vertical descent toward sunset, forward tracking movement stops until cell 102 is out of focus as shown in FIG. 4f. Forward movement then resumes until reversing switch 116 is engaged by actuator 106 as shown in FIG. 4g restoring it to its position as shown in FIGS. 4a and 6. Reverse intermittant tracking operation then ensures as shown in FIG. 4h. The downward vertical movement of the sun is thereby followed until sunset, at which point none of the cells 100 and 102 are sufficiently exposed to radiation and relays 108 and 118 are deenergized. The tracking system will then be reset and the reflector will be in its starting position.

Figure 7:
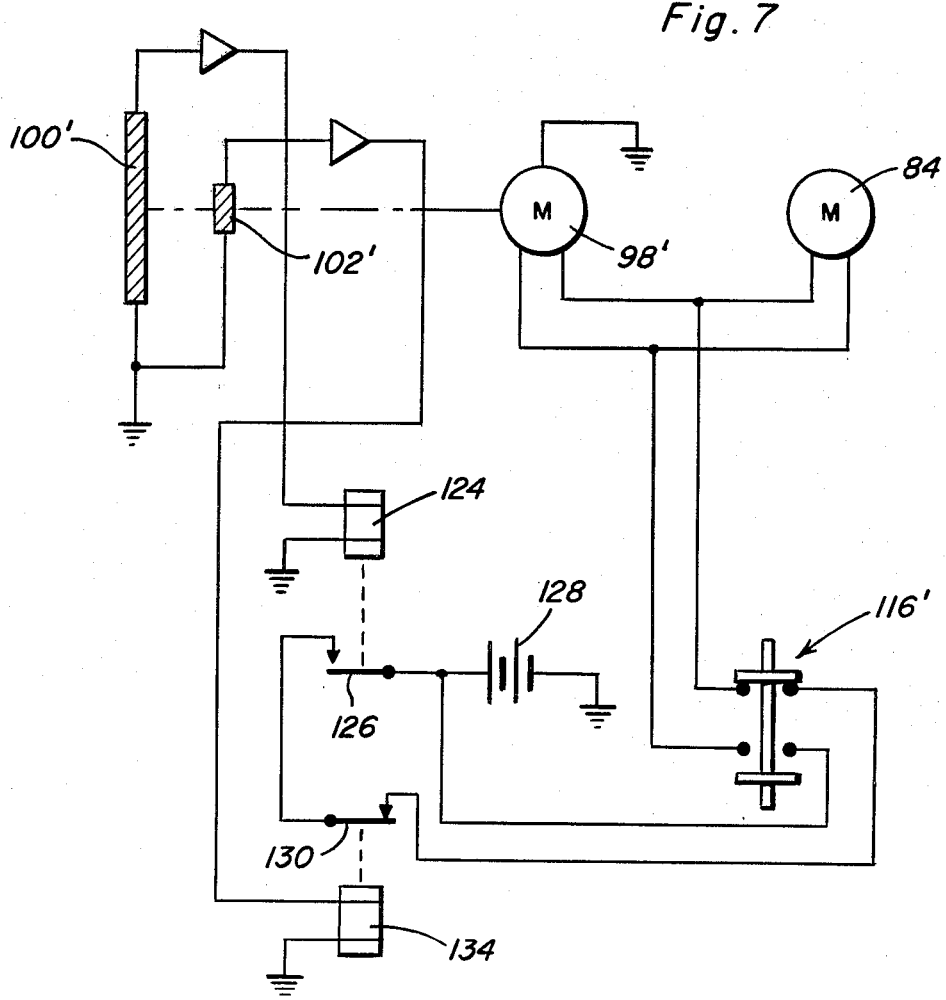

During the foregoing vertical tracking operation, a similar arrangement of a cylindrical lens and cells 100' and 102' control energization of the horizontal servomotor 84 and a tracking motor 98' through a relay tracking circuit as shown in FIG. 7. At sunrise the cell 100' is exposed to radiation to energize relay 124 closing its relay switch 126. Power is thereby transmitted from source 128 through normally closed relay switch 130 and a reversing switch 116' to one of the power terminals of servomotor 84 and tracking motor 98'. Movement of the cell housing then ensues until switch 116' is actuated to its other operative position connecting the power source directly to the motors 84 and 98' for resetting operation independently of solar cell control. When reset is completed, the switch 116' is restored to the position shown in FIG. 7 switching the unit to solar cell control. Horizontal tracking movement of the reflector 72 and the cell 100' then ensues until radiation is focused onto cell 102' causing it to energize relay 134 and open relay switch 130 to stop motor operation. Thus, horizontal tracking movement is intermittent in one direction under solar cell control until the cells are no longer exposed to radiation. The motors therefore stop movement of reflector 72 before actuation of switch 116'. At the next sunrise, operation as hereinbefore described is repeated.

Whenever solar radiation is reduced because of clouds during daylight hours, both vertical and horizontal tracking operation is interrupted by deenergization of the relays 108 and 124 respectively shown in FIGS. 6 and 7. As soon as the sun reappears to generate electrical signal energy in the control cells 100 and 100', the motors 88, 98, 84 and 98' are reenergized until the reflector reaches tracking position and then normal intermittent tracking operation is resumed until sunset.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a system for converting solar energy, a solar energy collector having a parabolic reflector concentrating solar radiation at a focal axis therein, and solar tracking means connected to the parabolic reflector for movement thereof to positions collecting maximum available solar energy, including servomotor means connected to the reflector for angular movement thereof about perpendicular axes substantially intersecting at said focal axis, the improvement comprising lens means for transmitting solar energy along a collimated beam movable about a fixed tracking axis, first cell means for generating signal energy in response to reception of said solar energy in all positions thereof, second cell means for generating signal energy in response to reception of said solar energy transmitted by the lens means in a tracking position, tracking motor means connected to the cell means for angular movement thereof about said tracking axis, and relay means connected to the cell means for controlling energization of the servomotor means in response to said generation of signal energy.

2. The combination of claim 1 including a heat absorbing conduit coaxial with one of said perpendicular axes through which a heat exchange medium is conducted.

3. The system of claim 1 including a steam generator, heat exchange means operatively connecting the collector to the steam generator for supply of primary heat thereto, auxiliary burner means for supply of auxiliary heat to the steam generator, turbine driven generating means connected to the steam generator for producing electrical energy, chemical energy storing means connected to the turbine driven generating means for converting excess electrical energy into storage fuel components, and selectively controlled valve means for conducting said storage fuel components to the burner means to effect said release of auxiliary heat by combustion.

4. The system as defined in claim 3 wherein said chemical energy storing means includes a container of acidified water, a pair of electrode grids immersed in the acidified water, gas collecting means enclosing said electrode grids for respectively accumulating oxygen and hydrogen produced by electrolysis in response to DC voltage applied to the grids, and electrical converting means connecting the turbine driven generating means to the electrode grids for transforming the excess electrical energy into the DC voltage applied to the grids.

5. In a solar energy converting system having a radiation collecting reflector, a solar tracking device including servomotor means connected to the reflector for angular movement thereof, lens means for transmitting solar energy along a collimated beam movable about a fixed tracking axis, first movable cell means for generating signal energy in response to reception of said solar energy in all positions thereof, second cell means for generating signal energy in response to reception of said solar energy transmitted by the lens means in a tracking position, tracking motor means connected to the cell means for angular movement thereof about said tracking axis, and relay means connected to the cell means for controlling energization of the servomotor means in response to said generation of the signal energy.

* * * * *